(12) United States Patent
Lawn (10) Patent No.: US 10,986,779 B2
(45) Date of Patent: Apr. 27, 2021

(54) AGRICULTURAL PRODUCE BILLET CHOPPER

(71) Applicant: EHS MANUFACTURING PTY LTD, Cranbourne (AU)

(72) Inventor: Steven Lawn, Cranbourne (AU)

(73) Assignee: EHS MANUFACTURING PTY LTD, Cranbourne (AU)

(*) Notice: Subject to any disclaimer, the term of this patent is extended or adjusted under 35 U.S.C. 154(b) by 281 days.

(21) Appl. No.: 15/577,753

(22) PCT Filed: May 30, 2016

(86) PCT No.: PCT/AU2016/000184
§ 371 (c)(1),
(2) Date: Nov. 28, 2017

(87) PCT Pub. No.: WO2016/191795
PCT Pub. Date: Dec. 8, 2016

(65) Prior Publication Data
US 2018/0125005 A1 May 10, 2018

(30) Foreign Application Priority Data

May 29, 2015 (AU) ................................ 2015901994

(51) Int. Cl.
*A01D 45/10* (2006.01)
*A01F 29/09* (2010.01)

(52) U.S. Cl.
CPC .............. *A01D 45/10* (2013.01); *A01F 29/09* (2013.01)

(58) Field of Classification Search
CPC ........ A01D 45/10; A01D 43/08; A01D 75/10; A01D 75/12; A01F 29/09; A01F 29/095;
(Continued)

(56) References Cited

U.S. PATENT DOCUMENTS

| 934,436 | A | * | 9/1909 | Gray | ...................... | B27G 13/04 |
| | | | | | | 144/230 |
| 999,014 | A | * | 7/1911 | Laney | .................. | B27G 13/005 |
| | | | | | | 144/230 |

(Continued)

FOREIGN PATENT DOCUMENTS

| AU | 2008101145 A4 | 1/2009 |
| WO | 9316802 A1 | 9/1993 |
| WO | 2016191795 A1 | 12/2016 |

OTHER PUBLICATIONS

PCT International Search Report, PCT/AU2016/000184, dated Aug. 5, 2016.

(Continued)

*Primary Examiner* — Adam J Behrens
(74) *Attorney, Agent, or Firm* — TraskBritt (57) ABSTRACT

An apparatus comprising a pair of associated chopper drums, including a top chopper drum and a lower chopper drum. The chopper drum defines an axial cylindrical bore having a rotational axis into which is mounted a drive shaft (not shown) that is keyed radially to drive the chopper drum. Radially spaced from the rotational axis are a plurality of outwardly facing recesses defined by walls of a body of the chopper drum. Each recess extends longitudinally along the periphery of the chopper drum end-end to provide a recess for mounting a corresponding plurality of cutting blades. Each recess is defined by a longitudinally extending lower wall and an opposed and circumferentially spaced. The cross sectional profile of the chopper drum is generally consistent throughout its length and includes a plurality of ridges and troughs with the ridges built up to define therein the recesses, the ridges being interposed by the troughs. A higher side wall provides support for the cutting blade and is inclined relative to a plane extending radially outwardly (Continued)

from the rotational axis. The opposed smaller side wall supports a wedge clamp.

19 Claims, 8 Drawing Sheets

(58) Field of Classification Search
CPC .......... A01F 29/06; A01F 29/04; A01F 29/02; A01F 29/01; B27G 13/04; B27G 13/00; B27G 13/005; B27G 13/02; B27G 13/08; B27G 13/10; B02C 23/18; B02C 23/24; B02C 23/26
USPC .......................................................... 241/57
See application file for complete search history.

(56) References Cited

U.S. PATENT DOCUMENTS

| | | | | |
|---|---|---|---|---|
| 2,682,996 A * | 7/1954 | Forman | ................... | A01F 29/06 241/239 |
| 3,392,770 A * | 7/1968 | Whisler | ................. | A01D 43/14 241/41 |
| 3,788,048 A * | 1/1974 | Stiff | ....................... | A01D 45/10 55/406 |
| 4,443,999 A * | 4/1984 | Leigers | .................. | A01D 45/10 144/229 |
| 4,819,703 A * | 4/1989 | Rice | ...................... | B23C 5/2269 144/117.1 |
| 5,092,110 A * | 3/1992 | Dommert | .............. | A01D 45/10 209/139.1 |
| 5,240,192 A * | 8/1993 | Tilby | .................... | A01F 29/095 144/174 |
| 5,829,700 A * | 11/1998 | Pianca | .................... | A01F 29/06 241/300.1 |
| 5,857,506 A * | 1/1999 | Paolone | ................ | B23C 5/2265 144/174 |
| 6,119,741 A * | 9/2000 | Rowe | ..................... | B27G 13/04 144/117.1 |
| 6,450,430 B2 * | 9/2002 | Dykstra | ................ | A01F 29/095 241/242 |
| 6,500,062 B1 * | 12/2002 | Harris | .................... | A01D 45/10 460/79 |
| 6,508,049 B1 * | 1/2003 | Cox | ....................... | A01D 45/10 56/10.2 R |
| 7,182,112 B2 * | 2/2007 | Meados | .................... | B27C 1/02 144/117.1 |
| 2006/0283303 A1 * | 12/2006 | Smith | .................. | B23D 61/065 83/835 |
| 2008/0096621 A1 | 4/2008 | Perret | | |
| 2015/0327438 A1 * | 11/2015 | Cazenave | ............. | A01D 45/10 56/51 |
| 2016/0235010 A1 * | 8/2016 | Fattepur | ................ | A01F 29/06 |

OTHER PUBLICATIONS

PCT International Written Opinion, PCT/AU2016/000184, dated Aug. 5, 2016.
PCT International Preliminary Report on Patentability, PCT/AU2016/000184, dated May 12, 2017.

* cited by examiner

AGRICULTURAL PRODUCE BILLET CHOPPER

CROSS-REFERENCE TO RELATED APPLICATIONS

This application is a national phase entry under 35 U.S.C. § 371 of International Patent Application PCT/AU2016/000184, filed May 30, 2016, designating the United States of America and published in English as International Patent Publication WO 2016/191795 A1 on Dec. 8, 2016, which claims the benefit under Article 8 of the Patent Cooperation Treaty to Australian Patent Application Serial No. 2015901994, filed May 29, 2015.

TECHNICAL FIELD

This disclosure relates to an agricultural produce processor. More particularly, this disclosure relates to an agricultural produce chopper for cutting produce into manageable lengths.

BACKGROUND

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the disclosure of which the identification of pertinent prior art proposals is but one part.

Without limiting the generality of the disclosure, the prior art will be described with reference to apparatus for chopping of sugarcane, although there will be an apparent application of the disclosure to other similar fiber cropping situations involving fiber crops required to transport produce in a satisfactory density (greater than an unbilleted harvest) to a processing plant. Other crop examples are industrial hemp, leuceana and deboisia tree. It is desirable to chop sugarcane and other produce into short billet lengths to achieve more storage and transport mass per cubic meter. This is particularly when the entire crop is required to be processed for cogeneration, animal fiber or fodder. This is because the product may not have amass that is economical to transport or process. Typically, a length of 140 mm is the shortest average billet length that has been produced by clamping a cutting blade to chopper drums.

A means of clamping the blade to the chopper drum has been described in AU2008101145 by the present Applicant. In that disclosure, the chopper drum had blade pockets 1 that were axially aligned relative to the chopper drum. A blade 2 was inserted either side of the pocket 1. A clamping system comprising a wedge shaped bar 3 was provided that held the blades either side of the pocket. Bolts 4 tightened the clamping system radially relative to the drum. This arrangement made billet lengths of 75 mm achievable on a 12 blade drum chopper. The wedge type blade retaining means was not limited to the amount of pockets that can be machined on the drum. If a longer billet was desired, some blades could be removed and replaced with spacers, but if short billet lengths were required, then closely associated blade pairings were preferred.

However, the aforementioned prior art has limitations in terms of production speed and mass output. The blades are paired together and billets tend to jam unless slower harvester speeds are imposed, thereby limiting the speed of production.

BRIEF SUMMARY

This disclosure according to one or more aspects is as defined in the independent claims. Some optional and/or preferred features of the disclosure are defined in the dependent claims.

Accordingly, in one aspect of the disclosure there is provided:

An apparatus for chopping agricultural produce into billet lengths of between 70-350 mm in length, the apparatus comprising at least one rotatable chopper drum to which a plurality of radially exposed cutting blades are mounted and interact to cut the produce into billets with residual extraneous matter an undesirable by-product, wherein each cutting blade is mounted in a corresponding one of a plurality of recesses in the chopper drum and fixed securely in place in the recess by one or more clamps applying a substantially radially aligned inwardly directed force, the blade secured in the recess by the clamp without fasteners intersecting the blade; and each clamp correspondingly shaped relative to the recess to progressively tighten the corresponding blade in the respective recess substantially radially inwardly relative to each drum's rotational axis.

In another aspect, the disclosure provides:

A method of operating an apparatus for chopping agricultural produce into billet lengths of between 70-350 mm in length, the method including:

feeding the raw or pre-prepared produce into an apparatus comprising at least one rotatable chopper drum to which a plurality of radially exposed cutting blades are mounted;

mounting each cutting blade in a corresponding one of a plurality of recesses in the chopper drum whereby the blade is secure in the recess by the clamp without fasteners intersecting the blade;

clamping the fixing blade securely in place in the recess by one or more clamps applying a substantially radially aligned inwardly directed force, each clamp correspondingly shaped to progressively tighten the corresponding blade in the respective recess substantially radially inwardly relative to each drum's rotational axis.

In a preferred form, the method disclosure further includes passing fluid at sufficient pressure through at least one conduit in each chopper drum substantially radially outwardly to urge undesirable extraneous matter away from the cutting blades once cut. Furthermore, the passage of fluid is preferably projecting towards a cleaning chamber associated with the apparatus, such as a harvester.

The apparatus may comprise a single chopper drum associated with a chopping base or pad against which the cutting blades act to cut the produce. The base may comprise a groove with which the or each cutting blade registers as it effects the cutting stroke.

Preferably, the apparatus comprises two or more associated chopper drums. The apparatus preferably comprises two or more pairings of chopper drums. The chopper drums are generally about 600-1500 mm in length.

Each Chopper drum comprises a drive source. The drive source preferably includes mountings for a drive shaft. The drive source may include the drive shaft or the chopper drum may be supplied separately to the drive shaft and assembled in situ. The drive shaft preferably extends axially through a drive gear or coupling.

Pairings of chopper drums may be counter driven individually or by a common drive means. Counter rotation and meshing of the blades between each drum may be controlled by means of timing gears that may have adjustments and setting controls to govern the interaction between drums. The drive shafts are typically keyed, doweled or bolted to resist the chopper drum from rotating relative to the timing gears and drive source. A computer controlled device may be used to control the speed and torque applied to each drive shaft and to coordinate the rotation and/or synchronization of the paired drums.

The chopper drum may be consistent in cross-section throughout its length. The chopper drum recesses are preferably longitudinally aligned. The recesses are preferably parallel relative to one another. Each recess, and hence each associated blade, may follow an axial spiral or curved path along the length of the chopper drum. The helically shaped blades may facilitate the removal of billet product and extraneous material from the cutting zone by breaking up the packing effect of the cutting process that may occur with linear and parallel blade arrangements. In any case, the recesses may follow a linear and axial path aligned parallel to the rotational axis and the drive shaft in an alternative arrangement that takes advantage of reduced manufacturing costs for the manufacture of component parts of substantially consistent cross-section along their respective lengths.

The recesses have cross-sectional profiles that are generally channel or wedged shaped throughout their length. Each recess preferably comprises at least one first side wall extending at least a length corresponding to the length of a corresponding a main body of the cutting blade, the main body comprising a substantially plate like planar portion adjacent a tapered blade tip portion.

The recess preferably comprises a second side wall opposed and extending axially parallel to the inclined first side wall. The second side Wall preferably lies in a plane inclined relative to the inclined first side Wall and may lie in a plane extending substantially radially and axially from the rotational axis. The profile of the or each recess may define a wedge shape in cross section, such that a base of the recess profile in cross section is narrower than a Wider mouth radially spaced therefrom.

The clamp is shaped to correspond to the recess profile. The clamp may extend the full length of the recess. The clamp is preferably shaped like a Wedge adapted to jam the blade into the corresponding shaped recess so that the greater the radially inward travel of the wedge clamp, the tighter the blade is secured against one side of the recess. The blade is preferably secured in the recess on the trailing side of the recess.

Alternatively, the clamp is one of a plurality of clamps spaced along die length of the recess to secure the cutting blade in the recess by attachment at intermittent, spaced points. The clamp may be wedge shaped to progressively bear its walls against the inclined first wall of the recess. The radially inwardly directed clamping force may be effected by the fasteners. The fasteners may be cammed or threaded devices to provide means to progressively bear one of the clamp walls against one, both or all of the recess walls. Preferably, the fasteners are threaded bolts that may be progressively tightened to engage with a corresponding threaded bore extending radially through the base of the recess and preferably into a body of the chopper drum. The clamp may extend the full length, or substantially the full length of the recess, and/or the cutting blade.

The cutting blade may be paired with another cutting blade in one of the recesses on the chopper drum, or may be non-paired and arranged as single blades. The cutting blades may be equi-spaced circumferentially about the chopper drum. The cutting blades may be circumferentially grouped in pairs, the pairs equi-spaced circumferentially about the chopper drum. The circumferential spacing of the cutting blades of a first chopper drum may be complementary to, and may correspond to, the circumferential spacing of the cutting blades of a second associated chopper drum. Each drum may comprise 3 or more recesses to secure 3 or 6 or more corresponding blades. Preferably, each drum comprises five to eight recesses and a corresponding number of blades. Preferably, each chopper drum includes 3-12 recesses and corresponding blades.

The respective coacting cutting blades of associated chopper drums may interact with a scissor action to, in use, cut and form the billets as they rotate into and out of a sliding relationship causing a sheeting action with the continuous rotation of the associated chopper drums.

Billet lengths may vary depending on the product requirements. Billet lengths may be determined by the number of cutting blades per chopper drum, the speed of feed into the apparatus and the speed of evacuation of cut billets once processed. Preferably, billet lengths are between about 65-350 mm and still more preferably, billet lengths are between 150-250 mm. Most preferably, billet lengths of about 170-220 mm are obtained.

Feeding mechanisms include typical agricultural produce feeding mechanisms available for produce that comprises long and relatively rigid stems or substantially linear branches, such as sugarcane. Feeding mechanisms include conveyer belts, guides, chutes and/or rollers, to deliver a high volume of produce to a cutting zone at which the rotating cutting blades effect the cutting stroke. Produce volumes can vary from 10-400 tonnes per hour, Typical throughput of the apparatus and its chopper drums would be about 100-200 tonnes per hour.

Each chopper drum may comprise at least one conduit for the passage of fluid. The passage for conveying fluid may project fluid substantially radially outwardly to urge the extraneous matter amongst the produce away from the cutting blades. Preferably, the extraneous matter is to be projected towards an extractor Cleaning Chamber, for example, forming part of the apparatus, such as a harvester.

The fluid path conduit may extend axially through the drive shaft. The fluid supply may be delivered through the drive shaft to the cutting zones. The fluid may be delivered to the chopper drum by any axial or radially mounted rotating coupling. The fluid may be delivered to the chopper drum by any other device for through-transfer of a fluid from a fixed fitting to a rotating receiver. The fluid path conduit preferably extends in part axially through the drum body in a direction parallel to the rotational axis. The fluid path conduit may be spaced radially from the rotational axis. The fluid path conduit preferably comprises a radially directed portion extending outwardly. The radially extending portion of the fluid path conduit is preferably adapted to direct fluid outwardly to displace by force of the passage of the fluid the cut billets, and extraneous matter, such as debris, trash and dirt, from the cutting blades as the chopper drum rotates.

Effective and rapid expulsion and separation of the bundle of billets and extraneous matter from the chopper drum enables an efficient transfer of the processed product to a cleaning chamber. This enables effective separation of the extraneous matter from the billets to enhance presentation. This also enhances the productivity of the cleaning chamber. Effective and rapid expulsion and separation of the bundle of billets and extraneous matter from the chopper drum by the outwardly expelled fluid from the chopper drum also enables faster rotational chopper drum speed. Whilst achieving separation of extraneous matter from the billets.

The number of conduits, their location and their dimensions, together with the fluid pressure maintained therein, determines the rate of removal of produce from the cutting zone and separation of extraneous matter from the billets after they have been removed from the cutting zone. The chopper drum may include between 1-20 conduits, preferably 6-15 conduits, and most preferably about 10-12 conduits. Multiple pathways may merge to join a single pathway and deliver fluid through a merged radially outgoing conduit. Alternatively, the fluid conduit includes one or more main, central conduits that branch outwardly to terminate at a plurality of fluid nozzles or outlets.

Preferably, the fluid is air and the conduit is an air passage.

BRIEF DESCRIPTION OF THE DRAWINGS

This disclosure may be better understood from the following non-limiting description of preferred embodiments, in which:

FIG. 3c is a view of section A-A of the chopper drum according to the second embodiment shown in FIG. 3a;

FIG. 8b is an end view of the upper chopper drum shown in FIG. 8a;

DETAILED DESCRIPTION

Preferred features of the disclosure will now be described with particular reference to the accompanying drawings. However, it is to be understood that the features illustrated in and described with reference to the drawings are not to be construed as limiting on the scope of the disclosure.

Referring to FIGS. 1a-6, there is shown an apparatus 10 comprising a pair of associated chopper drums (generally referred to by reference numeral 20), including a top chopper drum 21 and a lower chopper drum 22. Each chopper drum 20 defines an axial cylindrical bore 25 having a rotational axis 26 into which is mounted a drive mechanism 52 that drives the lower chopper drum 22.

Figure 4A:
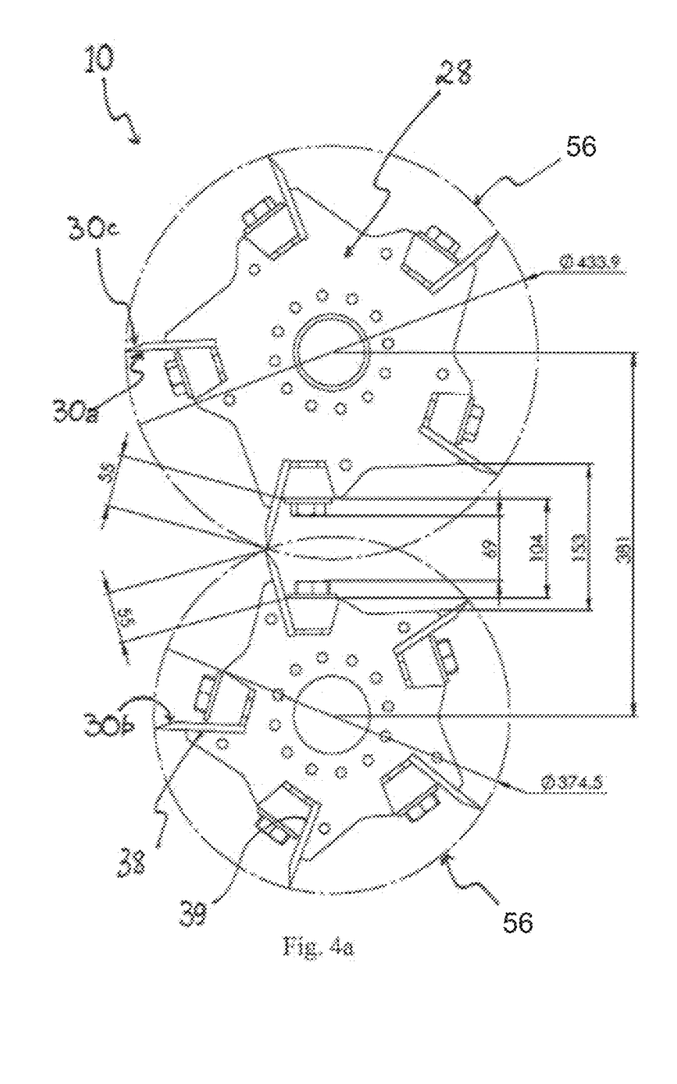
FIG. 4a is an end view of the pair of associated drums according to the first embodiment shown in FIG. 1 without produce.
Figure 4B:
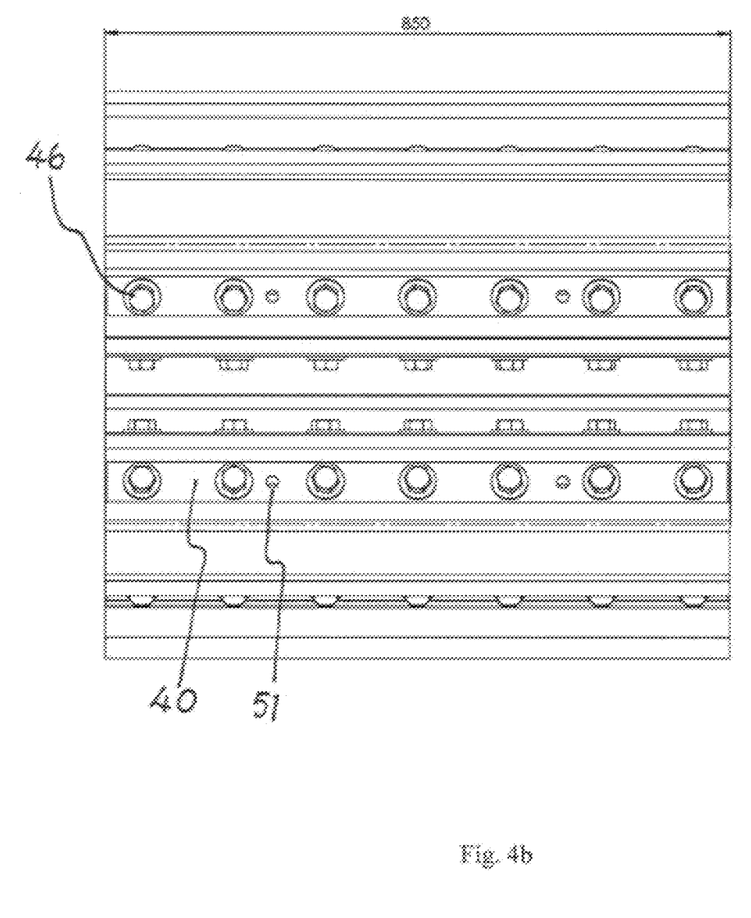
FIG. 4b is a front plan view of the apparatus shown in FIG. 1.

The upper drum 21 is larger in diameter compared to the lower drum 22 as illustrated in FIG. 4a. The dimensions of the component parts of the associated pair of chopper drums 21, 22 are as follows: the upper chopper drum 21 sweep zone 56 (the volume swept by the rotating blades 35) is about 10-20%, and preferably about 15-16% greater than that of the lower chopper drum 22. However, the respective drums 21, 22 rotate at the same speed (rounds per minute), with opposed blades 35 of each drum meeting in a shearing action as the drums 20 rotate. The leading blade faces 30b of the lower drum 22 present an inclined surface, whereas the leading blade faces 30a of the upper drum 21 are shear and it is the rear face 30c of the blades 35 of the upper drum 21 that is inclined to slide passed the leading inclined face 30b to effect the shearing action of the opposed blades 35. This achieves an effective cutting action that is enhanced by the mounting of the blades 35 in the respective recesses 30. The blades 35 of each drum 21, 22 are substantially the same shape and dimensions and are held rigidly in the recesses 30.

Figure 6:
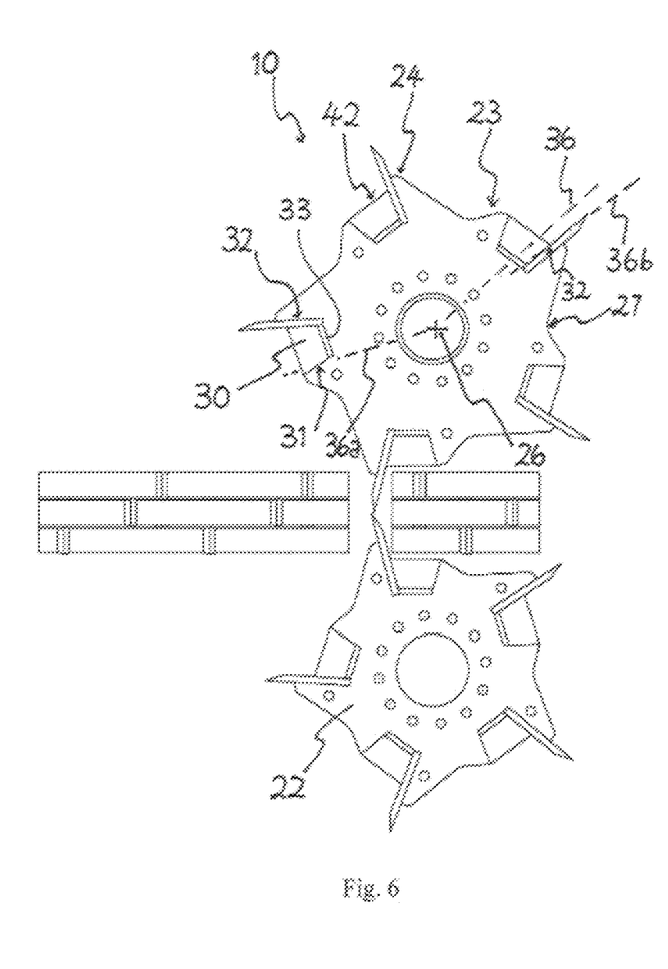
FIG. 6 is an end view of the apparatus shown in FIG. 1, with the clamps and bolts omitted to clearly illustrate blade receiving recesses.

Radially spaced from the rotational axis 26 are a plurality of outwardly facing recesses 30 (best seen in FIG. 6). Each of the recesses 30 are defined by walls of a body 28 of the chopper drum 20. Each recess 30 is generally channel or wedged shaped and extends longitudinally along the periphery of the chopper drum 20 end to end to provide the recess 30 for mounting a corresponding plurality of cutting blades 35. Using, as an example, the recess 30a shown in FIG. 6, each recess 30 is defined by a longitudinally extending first lower wall 31 and an opposed and circumferentially spaced (assuming the chopper drum 20 to be generally cylindrical about its outer periphery 23) second higher side wall 32 (the upper and lower designation referring to the relative heights of each wall 31, 32 or the length of each wall from the recess base 33 closest to the rotational axis 26 to the outer periphery 23. The first wall 31 is more inclined relative to a radial plane 36a extending outwardly from the rotational axis 26 and intersecting a portion of the first wall 31 plane. The second Wall 32 is more closely aligned parallel to and therefore less inclined relative to at radial plane 36b extending outwardly from the rotational axis 26 and intersecting a portion of the first wall 32 plane. In any case, the first and second walls 31, 32 converge substantially radially inwardly to create the wedge shaped recess 30 when viewed end-on as in FIG. 6.

The recess 30 comprises a radially inward base 33 aligned in a plane generally parallel to the average tangent of the generally radially spaced outer periphery 23 of the drum 20. The first inclined wall 31, the second opposed wall 32 and the base 33 complete the generally channel-shaped recess 30 profile. In cross-section, the recess 30 may be considered to have an isosceles trapezoidal- or acute trapezoidal-shape. The clamp 40 is shaped like a wedge that is adapted to jam the blade 35 into the corresponding shaped recess 30 so that the greater the radially inward travel of the wedge clamp 40 as effected by the tightening of a faster or bolt 46, the tighter the blade 35 is secured against one side wall 32 of the recess 30. This construction achieves a very rigid clamping effect of the blade 35 which enhances the shear effectiveness of the blades 35 as they couple to cut the billets.

The blade 35 is secured in the recess 30 on the trailing side 32 of the recess 30 between the side wall 32 and the rear wall 47 of the clamp 40. The positioning of the blade 35 on the trailing side 32 of the recess 30 is advantageous as the side wall 32 is bulked up or higher due to a shoulder or ridge formation 24 than the leading side wall 31 to give greater support and rigidity to the main body 34 of the blade 35 that is trapped between the high rear wall 32 and the rear wall 47, whilst the exposed cutting blade tip 35a only marginally flexes and interacts with the similarly constructed blade 35 on a paired drum 20 to permit a scissor or shearing action to occur to cut the raw produce 60 into billets 61. The clamping structure holds the blade body 34 extremely rigidly in friction fit without the direct securing of the blade 35 with fasteners, the fastener 46 being applied to the clamp wedge 40.

The cross sectional profile of the chopper drum 20 is generally consistent throughout its length and may have a generally star-shaped cross-sectional profile as shown in FIG. 6. In profile, the chopper drum 20 includes a plurality of ridges 24 and troughs 27 that extend longitudinally along the length of the drum 20. The star-shaped profile may have 3 or more outer radial "points" corresponding to the number of ridges 24 and recesses 30 on each drum 20.

The ridges 24 extending along the outer periphery 23 are built up to define therein the recesses 30, the ridges 24 being interposed by the troughs 27. A higher side wall 32 provides support for the cutting blade 35. The higher side wall 32 is substantially parallel relative to a plane 36a extending radially outwardly from the rotational axis 26 and passing substantially centrally through the recess 30 in which the blade 35 is secured. The opposed smaller side wall 31 supports a wedge clamp 40 and is aligned in plane substantially parallel to a plane 36b extending radially outwardly and passing through the trough 27 immediately forward of the corresponding recess 30. Each wedge clamp 40 is generally sized so that its outer face 42 lies in a plane substantially normal or slightly inclined (between 1-15) to the normal relative to a radial plane extending from and parallel to the rotational axis 26.

Trial results demonstrate a decrease of juice loss of the order of 30-50%, and more consistently 35-40% less juice loss, and a decrease of up to 10% in damaged billets in the use of the inventive chopping process, primarily it is believed due to the rigidity of the blades 35 and the clean billet cuts that are achieved. Moreover, the blade 35 rigidity enables faster drum rotation speeds to be run, thereby substantially allowing for an increase in rotational speeds of at least 10%, and corresponding productivity increases.

The wedge clamp 40 is an elongate solid strip or beam that extends substantially the full length of the recess 30, Cavities and pockets in the outer periphery 23 are minimized by shaping the outer face 42 to be substantially flush with the outer periphery 23, particularly the upper edge 37 of the lower side wall 31, whereby there is less opportunity for extraneous matter to collect and be undesirably trapped therein. The wedge clamp 40 comprises a plurality of apertures 29 equally spaced to receive a corresponding plurality of wedge bolts 46 adapted to threadably cooperate with corresponding threaded bores 29 in the body 28 of the chopper drum 20. The wedge clamp 40 is therefore secures in place the cutting blade 35. Longitudinally, the cutting blade is of similar length to its recess 30 and wedge clamp 40. The cutting blade 35 and the wedge clamp 40 extend substantially the full length of the recess 30 and terminates at or close to each end of the recess 30. The ends of each cutting blade 35 and wedge clamp 40 are flush with the respective ends of the recess 30, The recesses 30 may be co-terminal with the chopper drum 20. Alternatively, the recesses may be marginally inset Within the body 28 and marginally shorter in length longitudinally relative to the length of each chopper drum 20.

It can be seen that the wedge bolts 46 provide a radially directed force to progressively tighten the wedge clamp 40 into the correspondingly shaped wedge recess 30. The ridges 24 build up to provide a high recess wall that includes the high side wall 32. The high side wall 32 is between 0% and 50% higher than the lower side wall 31, preferably between 20-30%, and most preferably between 27-28%. The cutting blade 35 is therefore strongly supported at its rear face 38 by the high side wall 32, and at its front face 39 by the corresponding rear side wall 47 of the wedge clamp 40. For clarity it is noted that these recess side walls 31, 32 may be equal in height.

The chopper drum 20 includes conduits 50 that provide passageways for air or another suitable fluid. The conduits 50 provide for the passage of pressurized air through to radially outwardly facing outlets 51 extending through each of the wedge clamps 40. The pressurized air supply through the air conduits 50 facilitate the rapid displacement and separation of dirt, trash or any extraneous matter form the chopped billets 61. The effect of the pressurized air through the air conduit enhances the productivity of a cleaning chamber that may form part of the apparatus 10 and to which the billets 61 may be projected by the air blast from the outlets 5 1. The preliminary separation of extraneous matter 63 from the billets 61 increases productivity of the apparatus 10 by a substantial proportion; estimated to be about 38%. The removal of extraneous matter 63 from the cutting zone 53 permits faster rotational speeds of the chopper drums 20-22 while maintaining separation of extraneous matter 63 from the billets 61.

The conduits 50 comprise a longitudinally aligned radially inner array of conduits 54, the inner array 54 arranged substantially coaxial relative to the rotational axis 26, a longitudinally aligned radially outer array 55 of conduits aligned close to or adjacent to each of the recesses 30 and a plurality of radially aligned feeder conduits continuous with conduits extending radially through wedge clamps 40 and that communicate with the outlets 51 to deliver the fluid to the cutting zone 53.

Figure 5:
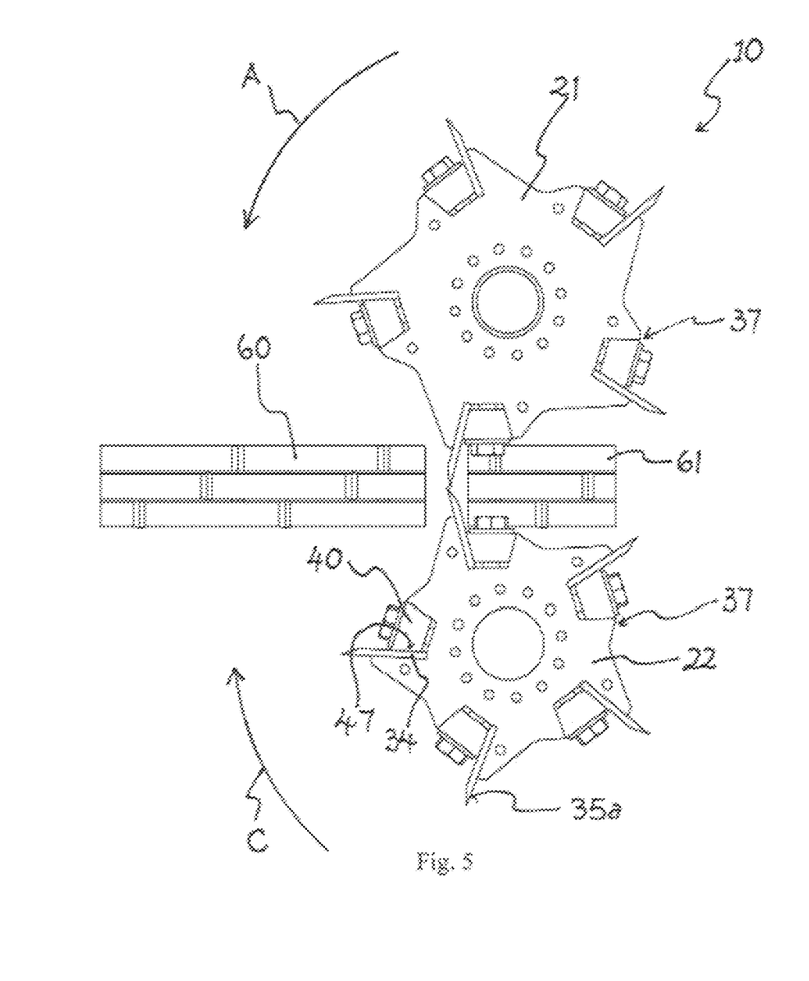
FIG. 5 is a similar end view of the apparatus shown in FIG. 4a with produce.

Referring to FIG. 5, it can be seen that the upper and lower chopper drums 21, 22 are counter rotated with the upper chopper drum 21 rotating in an anti-clockwise direction A and the lower chopper drum 22 rotating in a clockwise direction C. This achieves the chopping of the raw material, such as sugar cane 60, into billets 61 of desirable lengths, such as 150 mm. The outlets 51 blast or deliver a stream of outwardly directed fluid such as air into the cutting zone 53 to achieve three advanced outcomes:

1. The initial cleaning of the billets 61 preparatory to their entry into the cleaning chamber;

2. The cleaning of debris from the blades 35 to extend the usage time of each blade 35 to reduce maintenance, repair and downtime costs; and 3. Clear the cleaning zone (cutting zone) 53 of debris and billets 61 to enable the apparatus 10 to be operated at a significantly higher speed relative to the prior art apparatus for significantly greater productivity.

Figure 1A:
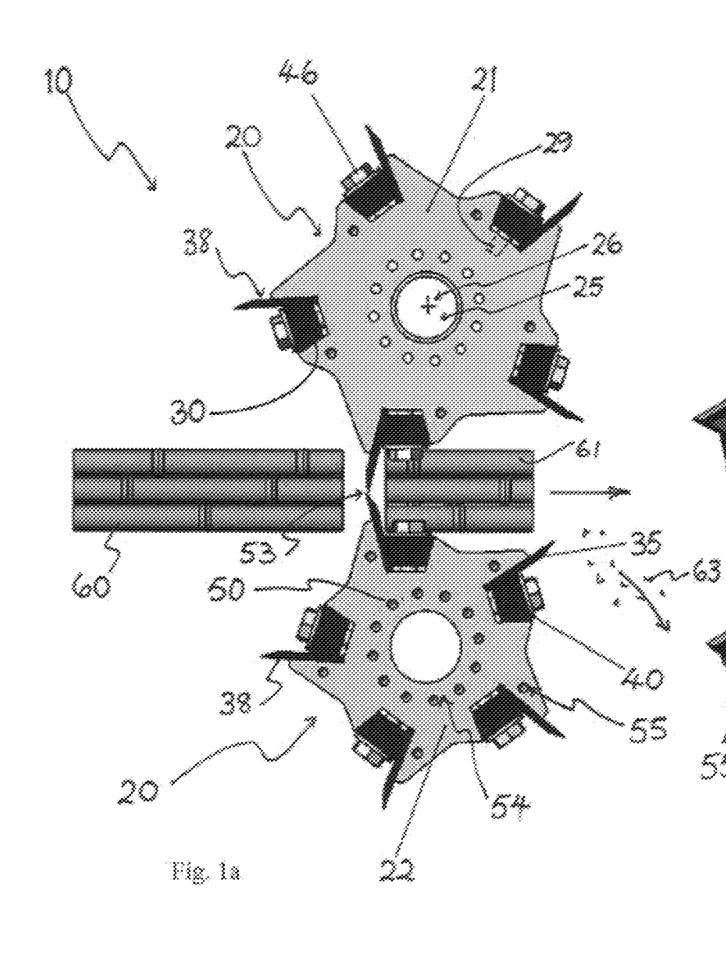
FIG. 1a is an end view of an apparatus for chopping of agricultural produce comprising a pair of associated chopper drums according to a first embodiment.
Figure 1B:
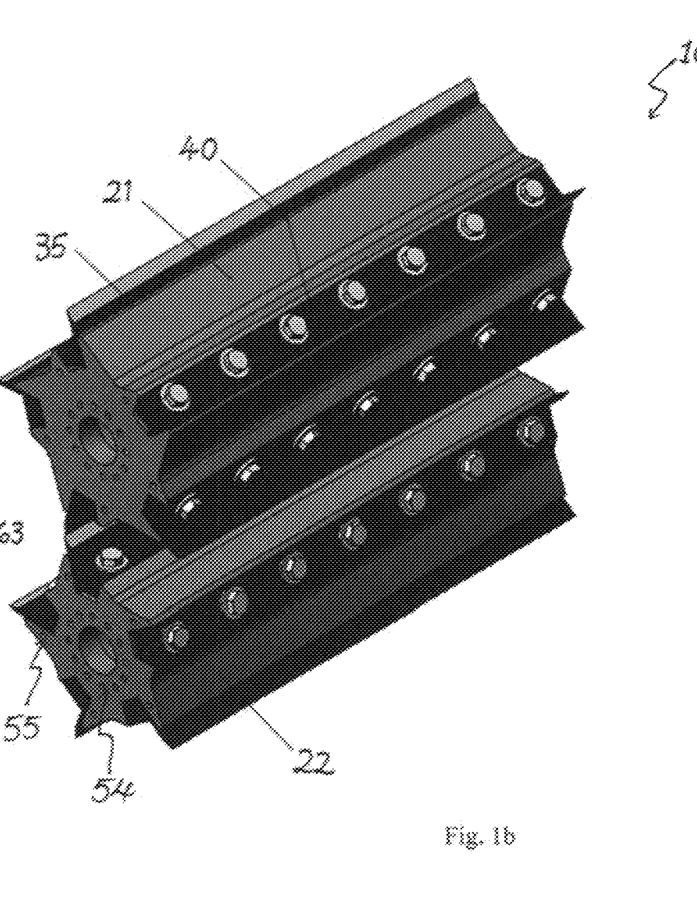
FIG. 1b is a perspective view of the apparatus shown in FIG. 1.
Figure 2A:
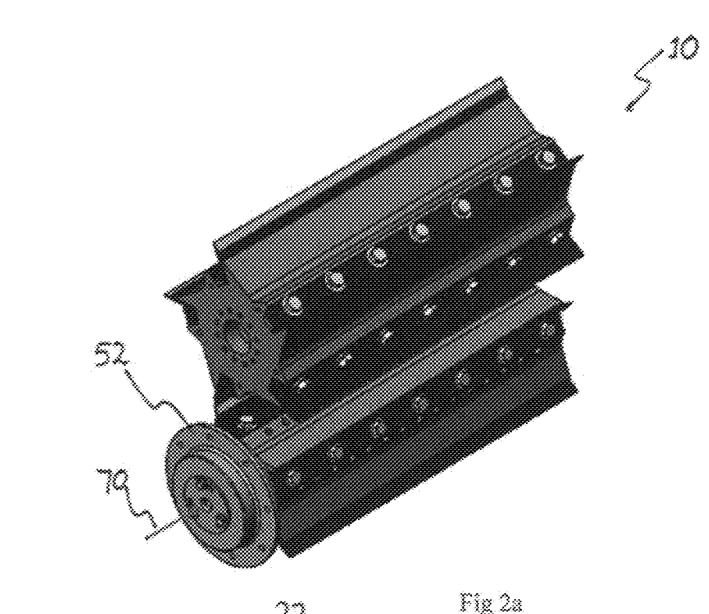
FIG. 2a is a perspective view of a pair of associated chopper drums according to the first embodiment with a drive wheel axially attached to the lower chopper drum.
Figure 2B:
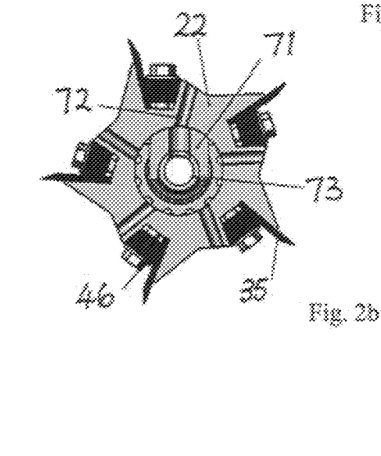
FIG. 2b is a cross-sectional end view of the upper chopper drum of the first embodiment.
Figure 2C:
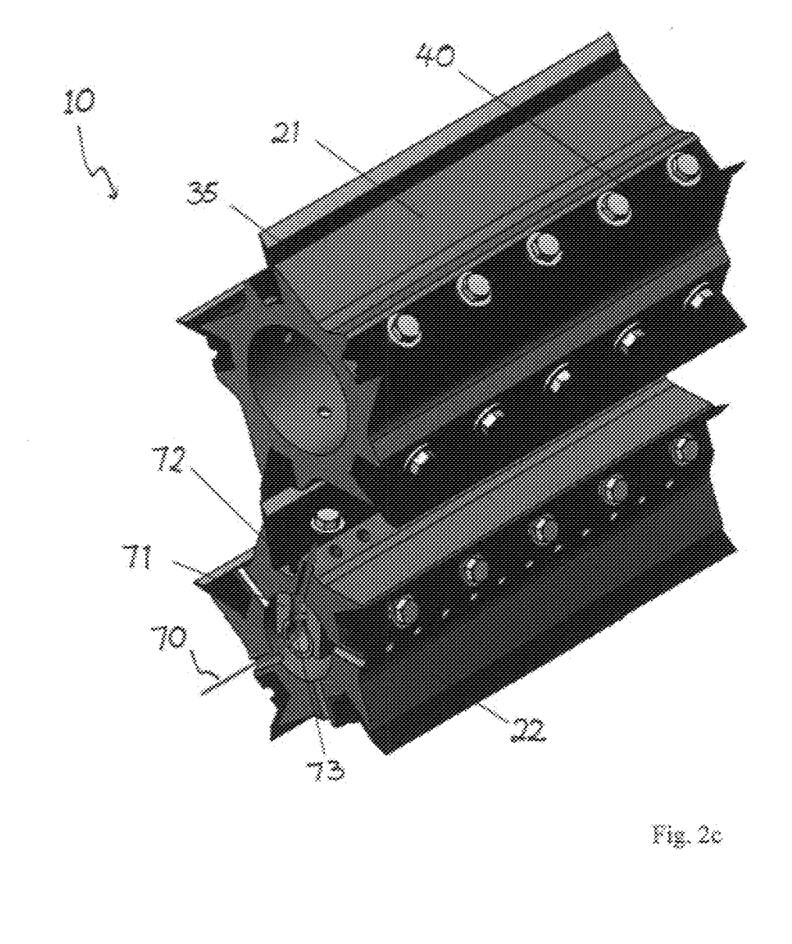
FIG. 2c is a perspective sectional view of the first embodiment.
Figure 3A:
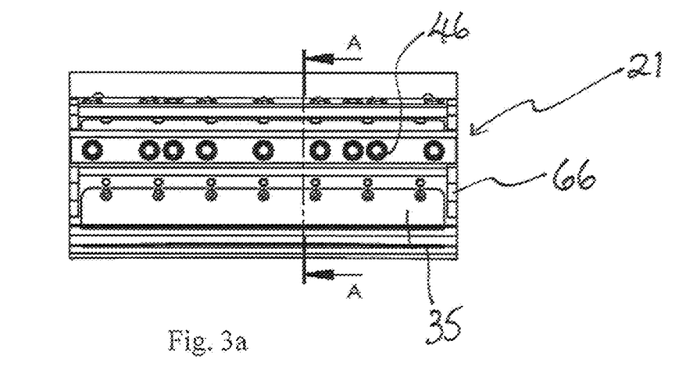
FIG. 3a is a front elevational view of a chopper drum according to a second embodiment.
Figure 3B:
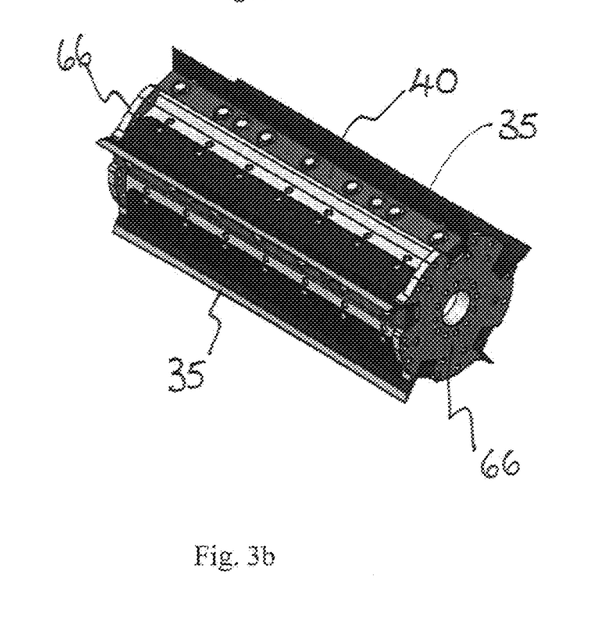
FIG. 3b is a perspective view of the chopper drum according to the second embodiment.
Figure 3C:
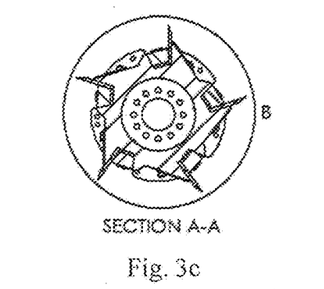
Figure 3D:
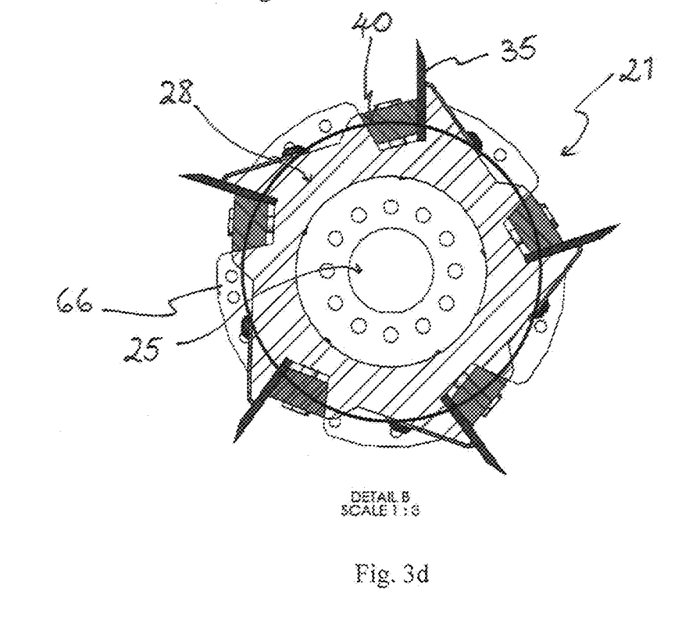
FIG. 3d is an enlarged end view of the chopper drum shown in FIG. 3.

In FIGS. 2a-2c, the primary air feed 70 passes through the drive mechanism 52 and into a fixed position blast shroud 71. The pressurized air or other fluid travels from the blast shroud 71 via a central fixed position blast tube 73 into a plurality of radially aligned blast ports 72. Air is forced down the blast tube 73, through the blast shroud 71, and as the chopper drum 20 rotates, the blast port 72 passes over the blast shroud 71 communicating a blast of air out of the lower chopper drum 22 blast ports 72 and through the outlets 51.

FIGS. 3a-3d show a detailed view of the upper drum 21, including the wedge-shaped clamps 40 that secure, in rigid friction lit, the blades 35. Each end of the drum 21 is capped by an end cap 66 to longitudinally trap the wedge 40 and blades in the recesses.

Figure 7A:
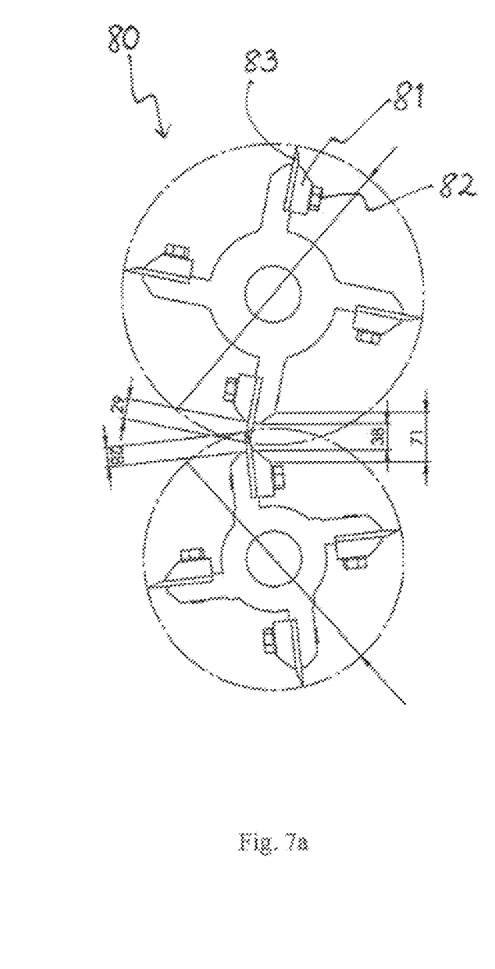
FIG. 7a is an end view of an example of a pair of associated chopper drums whereby the blades are held in place by fasteners intersecting the blades.

FIG. 7a shows a pair of rotor drums 80 as an example of blades secured in a shallow recess and clamped by a block 81 and fasteners 82 extending through the blades 83. This arrangement is inferior to the arrangements 10 of the disclosure in that the fastening of the blade 83 by extension directly through the body of the blade constitutes a weaker structure whereby the blades 83 flex and become lose in their mounting with the vigorous and harsh wear associated with the billeting process, In contrast, the blades 35 of the disclosure are securely fixed by a broad surface of the wedge 40 tightened to an optimum level by the fasteners 46 in the wedge shaped recesses 30. The blades 35 remain rigid for longer and permit faster rotational drum 20 speeds for greater productivity.

Figure 7B:
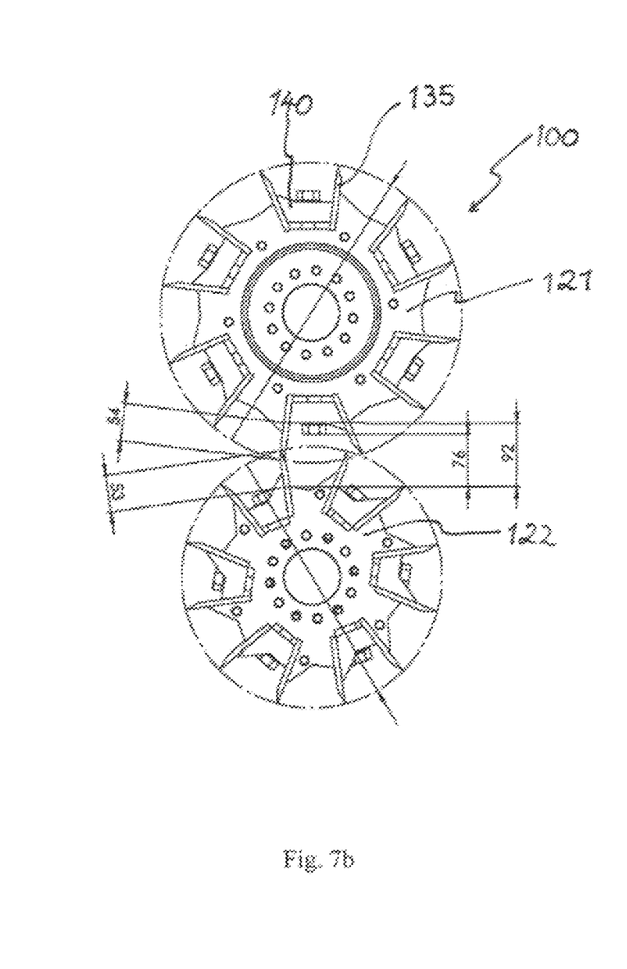
FIG. 7b is an end view of a pair of associated chopper drums each having 6 pairs of blades according to a third embodiment.

FIG. 7b shows an apparatus 100 that is variation of the first embodiment 10 in that each recess comprises a pair of blades 135 either side of the clamp 140. Again, the upper drum 121 is marginally larger in general diameter or swept volume compared to the lower drum 122. Shorter billet lengths are achievable with this apparatus 100 compared to the one blade per recess arrangement 10.

Figure 8A:
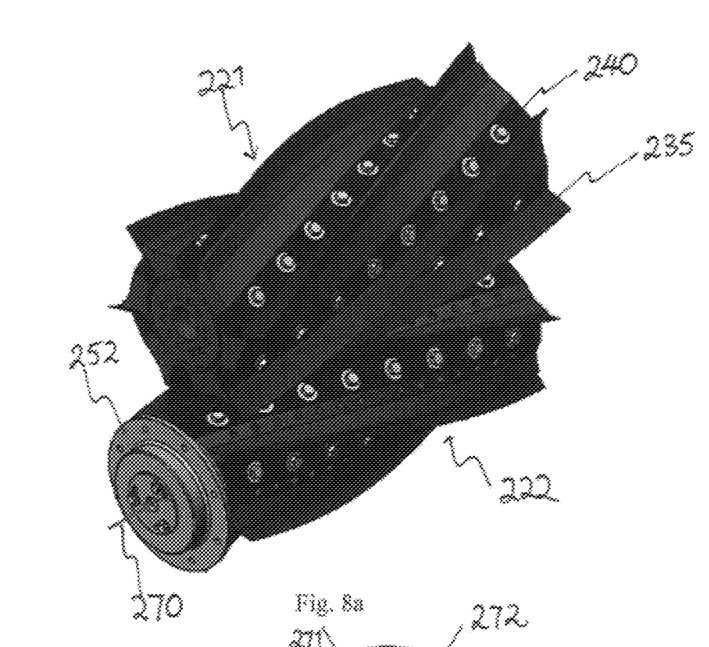
FIG. 8a is a perspective view of a driven pair of associated chopper drums having helically-shaped blades according to a fourth embodiment.
Figure 8B:
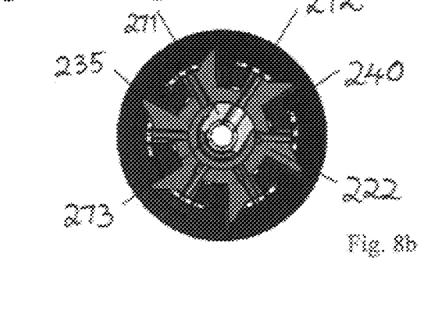
Figure 8C:
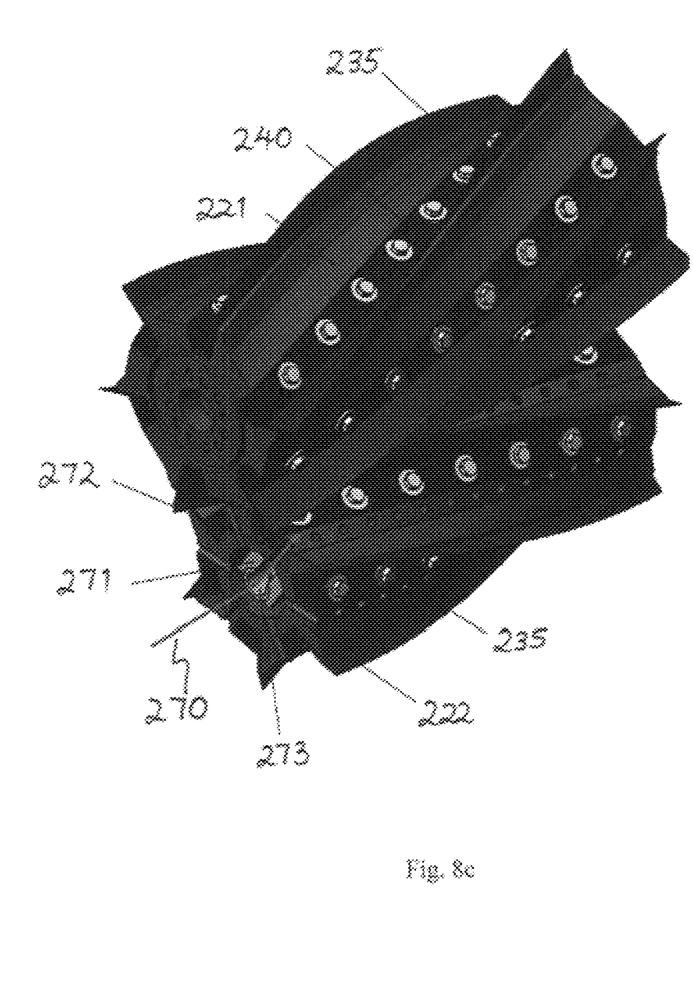
FIG. 8c is a perspective view of the pair of associated chopper drums according to the fourth embodiment.

FIGS. 8a-8c illustrate a drum pairing 221, 222 in which like features 21, 22, 35, 40, 52, and 70-73 are referenced with like features 221, 222, 235, 240, 252, and 270-273, respectively. The apparatus 200 includes helically shaped recesses 230 and corresponding blades 235 to produce an aggressive cutting apparatus 200 in which the blades 235 are clamped rigidly in place by helical anvil Wedges 240. The smaller, lower spiral drum 222 comprises six blades 235, whereas the larger upper drum 221 comprises five equally spaced outer blades 235. The air blaster 70, 270 is supplied to the lower smaller drum 22, 222 to effect preliminary separation of some extraneous matter 63 from the billets 61 as they are delivered to the cleaning chamber.

Figure 9A:
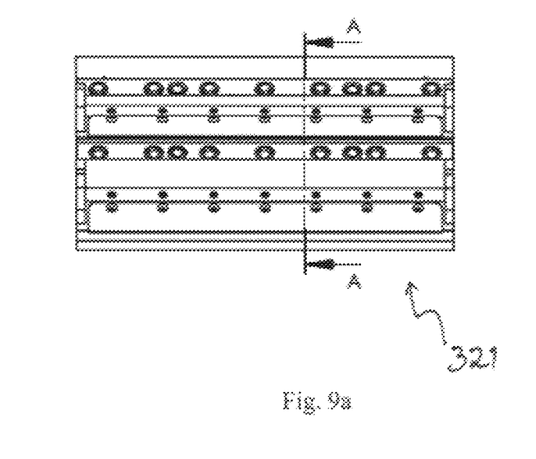
FIG. 9a is a front elevational view of a chopper drum according to a fifth embodiment.
Figures 9B, 9D:
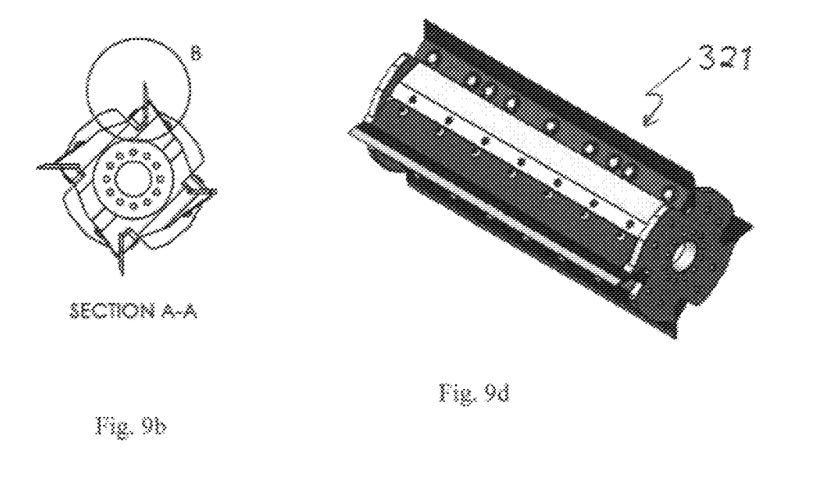
FIG. 9b is an end sectional view of the chopper drum shown in FIG. 9a through Section A-A.
FIG. 9d is a perspective view of the chopper drum according to the fifth embodiment.
Figure 9C:
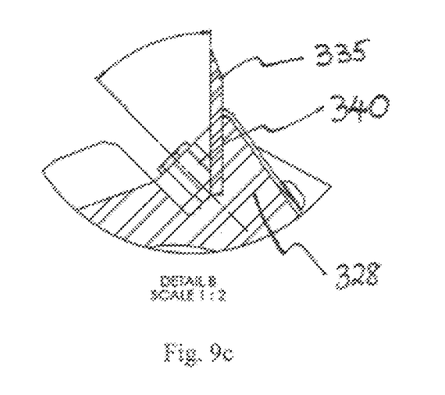
FIG. 9c is an enlarged view of portion B shown in FIG. 9b.
Figure 10:
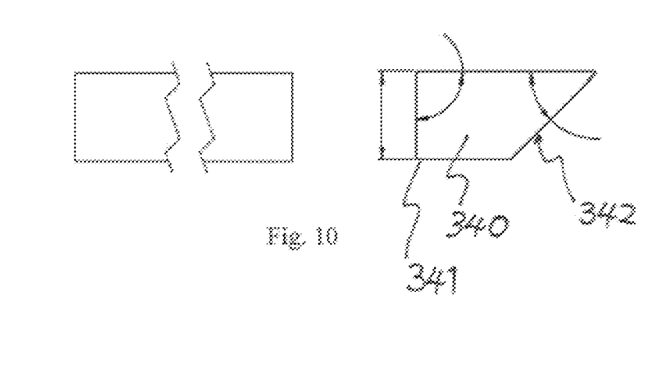
FIG. 10 is a side view of a Wedge clamp according to the fifth embodiment.

FIGS. 9a, b and d illustrate an upper drum apparatus 321 having four radially positioned blades 335 and demonstrate an alternative Wedge 340 shape adapted to trap the blade 335 in a drum recess 330, The wedge 340 comprises one right angled corner edge 341 and one opposed, inclined clamping face 342.

Throughout the specification and claims the Word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus," "means," "device" and "member" may refer to singular or plural items and are terms intended to refer to a set of properties, functions or characteristics performed by one or more items or components having one or more parts. It is envisaged that where an "apparatus," "means," "device" or "member" or similar term is described as being a unitary object, then a functionally equivalent object having multiple components is considered to fall within the scope of the term, and similarly, where an "apparatus," "assembly," "means," "device" or "member" is described as having multiple components, a functionally equivalent but unitary object is also considered to fall within the scope of the term, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the top chopper drum 21 uppermost. It will be appreciated by those skilled in the art that many modifications and variations may be made to the methods of the disclosure described herein without departing from the spirit and scope of the disclosure.

The invention claimed is:

1. An apparatus for chopping agricultural produce into billet lengths of between 70-350 mm in length, the apparatus comprising:

at least two rotatable chopper drums to which at least one of a plurality of radially exposed cutting blades is mounted that interacts with at least one other cutting blade of the plurality of radially exposed cutting blades to cut the produce into billets, a first cutting blade of the at least one of the plurality of cutting blades mounted in a corresponding first recess of a plurality of recesses in a first rotatable chopper drum of the at least two rotatable chopper drums and fixed securely in place in the first recess by a first clamp of at least one clamps, the first clamp applying a substantially radially aligned inwardly directed force to secure the first cutting blade in the first recess without fasteners intersecting the first blade, and the first clamp correspondingly shaped relative to the first recess to progressively tighten the first blade in the first recess substantially radially inwardly relative to a rotational axis of the first chopper drum, wherein the first chopper drum comprises:

a plurality of ridges that extend along the length of the first chopper drum;

a higher side wall providing support for the first cutting blade at a rear face of the first cutting blade; and an opposed lower side wall supporting the first clamp, the higher side wall being higher than the lower side wall relative to a base of the first recess;

the first cutting blade has a main body and an innermost portion of the main body that is the first cutting blade's radially innermost portion in the base;

the first clamp has a rear wall that is adapted to support a front face of the first cutting blade; and the higher side wall is adapted to support the rear face radially outwardly further from the innermost portion than the rear wall is adapted to support the first cutting blade.

2. The apparatus according to claim 1, wherein each chopper drum is 600-1500 mm in length and counter-rotated relative to each other by a drive source, and further wherein the higher side wall is bulked up or higher due to a shoulder or ridge formation than the lower side wall to give greater support and rigidity to the main body that is adapted to be trapped between the higher and lower side walls.

3. The apparatus according to claim 1, wherein the recesses are longitudinally aligned, parallel relative to one another and follow a linear and axial path aligned parallel to the rotational axis of the first chopper drum and a drive source in the form of a drive shaft.

4. The apparatus according to claim 1, wherein the recesses have cross-sectional profiles that are generally channel or wedge-shaped throughout their length and the cross sectional profile of the first chopper drum is generally consistent throughout its length.

5. The apparatus according to claim 4, wherein the lower side wall and the higher side wall converge inwardly to form a wedge shape of the first recess.

6. The apparatus according to claim 4, wherein the first clamp is wedge-shaped to correspond to the cross-sectional profile of the first recess, and extends substantially the full length of the first recesses.

7. The apparatus of claim 4, wherein the first clamp is wedge-shaped to progressively bear its walls substantially radially inwardly against the first blade and the lower side wall of the first recess.

8. The apparatus according to claim 7, wherein the substantially radially aligned inwardly directed force is effected by fasteners extending substantially radially through the base of the first recess and into a body of the first chopper drum.

9. The apparatus according to claim 1, wherein respective cutting blades of associated chopper drums are adapted to interact with a shearing action to cut and form the billets as they rotate into and out of a sliding relationship causing the shearing action with continuous rotation of the associated chopper drums.

10. An apparatus for chopping agricultural produce into billet lengths, the apparatus comprising:

at least two rotatable chopper drums to which at least one of a plurality of radially exposed cutting blades is mounted that interacts with at least one other cutting blade of the plurality of radially exposed cutting blades to cut the produce into billets, a first cutting blade of the at least one of the plurality of cutting blades mounted in a corresponding first recess of a plurality of recesses in a first rotatable chopper drum of the at least two rotatable chopper drums and fixed securely in place in the first recess by a first clamp of one or more clamps, the first clamp applying a substantially radially aligned inwardly directed force to secure the first cutting blade in the first recess without fasteners intersecting the first blade, and the first clamp correspondingly shaped relative to the first recess to progressively tighten the first blade in the first recess substantially radially inwardly relative to a rotational axis of the first chopper drum, wherein:

the first chopper drum comprises:

a plurality of ridges that extend along the length of the first chopper drum;

a higher side wall providing support for the first cutting blade at a rear face of the first cutting blade; and an opposed lower side wall supporting the first clamp, the higher side wall being higher than the lower side wall relative to a base of the first recess, and wherein each chopper drum includes at least one conduit to project fluid substantially radially outwardly to urge extraneous matter amongst the cut produce away from the cutting blades.

11. The apparatus according to claim 10, wherein a radially outwardly aligned portion of the at least one conduit is adapted to direct fluid outwardly to displace by force of the passage of the fluid the cut billets, trash and dirt, from the cutting blades as the respective chopper drum rotates.

12. The apparatus according to claim 1, wherein each chopper drum includes a main central body, which is substantially star-shaped in cross-sectional profile in which the plurality of ridges extend along an outer periphery of the main central body and are built up to define therein the recesses, the ridges being interposed by troughs.

13. The apparatus according to claim 1, wherein the first clamp is an elongate solid strip or beam that extends substantially the full length of the first recess.

14. The apparatus according to claim 1, wherein at least one fluid conduit provides a passageway for pressurized air to pass therethrough to radially outwardly facing outlets extending through the first clamp.

15. The apparatus according to claim 14, wherein each of the at least two rotatable chopper drums have a respective rotational axis, the conduits include a longitudinally aligned radially inner array of conduits arranged substantially coaxial relative to the respective rotational axis of the at least two rotatable chopper drums and branch outwardly to the outlets.

16. The apparatus according to claim 14, wherein the conduits include a longitudinally aligned radially outer array of conduits aligned close to or adjacent to each of the recesses, respectively, which are in fluid communication with the outlets to deliver the fluid to the cutting zone.

17. A method for operating an apparatus for chopping agricultural produce into billet lengths of between 70-350 mm in length, the method comprising:

feeding raw or pre-prepared produce into the apparatus, which apparatus comprises at least two rotatable chopper drums to which a plurality of radially exposed cutting blades are mounted;

mounting each cutting blade in a corresponding one of a plurality of recesses in one of the at least two rotatable chopper drums, each recess including a lower side wall and a higher side wall, the higher side wall being higher than the lower side wall relative to a base of each respective recess of the plurality of recesses;

clamping the cutting blades securely in place in each recess by at least one clamp respectively applying a substantially radially aligned inwardly directed force, each clamp correspondingly shaped to progressively tighten the corresponding cutting blade in the respective recess radially relative to each rotatable chopper drum's rotational axis respectively, the higher side walls providing support for each of the cutting blades at their respective rear faces; and wherein at least one fluid conduit provides a passageway for fluid to pass therethrough to radially outwardly facing outlets extending through the first clamp.

18. The method according to claim 17, wherein the method includes the step of initially cleaning the billets by exposure to the fluid egressed from the outlets into a cutting zone preparatory to their entry into a cleaning chamber and each chopper drum includes at least one conduit to project the fluid substantially radially outwardly.

19. The method according to claim 18, wherein the egressed fluid is effective to clean debris from the cutting blades.

* * * * *